(12) United States Patent
Gundogan et al.

(10) Patent No.: US 7,222,983 B1
(45) Date of Patent: May 29, 2007

(54) ELECTRONIC SYSTEM HAVING FRONT PANEL ASSEMBLY WITH REFLECTIVE CAPABILITY

(75) Inventors: C. Ilhan Gundogan, Lexington, MA (US); W. Brian Cunningham, Westborough, MA (US); Gerald J. Cote, Westborough, MA (US); Joseph P. King, Jr., Sterling, MA (US); Joseph P. DeYesso, Walpole, MA (US)

(73) Assignee: EMC Corporation, Hopkinton, MA (US)

( * ) Notice: Subject to any disclaimer, the term of this patent is extended or adjusted under 35 U.S.C. 154(b) by 91 days.

(21) Appl. No.: 11/020,805

(22) Filed: Dec. 22, 2004

(51) Int. Cl.
*F21V 33/00* (2006.01)

(52) U.S. Cl. .................. 362/133; 362/234; 362/85; 362/89; 362/247; 362/294; 362/373

(58) Field of Classification Search ............... 362/133, 362/253, 234, 249, 85, 89, 235, 247, 241, 362/294, 373; 361/724; D14/440, 441, D14/446
See application file for complete search history.

(56) References Cited

U.S. PATENT DOCUMENTS

| | | | |
|---|---|---|---|
| 2,085,180 A * | 6/1937 | Bevis | 434/371 |
| 3,420,940 A * | 1/1969 | Fuechsel et al. | 84/724 |
| 5,388,032 A | 2/1995 | Gill et al. | 700/17 |
| D421,431 S | 3/2000 | Mazzetti et al. | D14/442 |
| D421,977 S | 3/2000 | Wong | D14/444 |
| D447,485 S | 9/2001 | Carbonneau et al. | D14/445 |
| 6,297,948 B1 | 10/2001 | Buican et al. | 361/683 |
| D454,881 S | 3/2002 | Daniels et al. | D14/446 |
| D455,754 S | 4/2002 | Gant et al. | D14/446 |
| 6,477,055 B1 | 11/2002 | Bolognia et al. | 361/724 |
| D477,485 S | 7/2003 | Hoernig | D6/548 |
| D486,494 S | 2/2004 | Gundogan et al. | D14/444 |
| D496,050 S | 9/2004 | Gundogan et al. | D14/444 |
| 6,826,057 B1 | 11/2004 | Gundogan et al. | 361/726 |

* cited by examiner

*Primary Examiner*—Thomas M. Sember
(74) *Attorney, Agent, or Firm*—BainwoodHuang

(57) ABSTRACT

A front panel assembly is capable of being used with an electronic equipment rack configured to support electronic circuitry having multiple LEDs (e.g., a rack mount data storage system having a row of disk drives). The front panel assembly includes a cover portion configured to separate an external space in front of the electronic equipment rack and an internal space within the electronic equipment rack. The front panel assembly further includes an attachment portion configured to attach to the electronic equipment rack, and a reflective member configured to reflect light from the multiple LEDs simultaneously in a direction toward the external space.

18 Claims, 5 Drawing Sheets

ELECTRONIC SYSTEM HAVING FRONT PANEL ASSEMBLY WITH REFLECTIVE CAPABILITY

BACKGROUND

A typical rack mount data storage system includes a cabinet frame (or rack), a set of housings, a set of front panels, disk drives and related circuitry. The housings and the front panels mount to the cabinet frame. The disk drives and the related circuitry reside (i) within the housings and (ii) behind the front panels.

One conventional front panel has a two-tier design, i.e., a lower tier and an upper tier, and is configured to cover a horizontal row of disk drives adjacent a front opening of a respective housing which is mounted to the cabinet frame. The lower tier sits substantially adjacent the front opening and defines a horizontal row of holes which aligns with a horizontal row of light emitting diodes (LEDs) of the row of disk drives. The upper tier extends outwardly from the front opening by roughly one or two inches in a bowed manner, and defines a space which conceals a locking and releasing mechanism. A front panel which is similar to that described above is disclosed in U.S. Pat. No. 6,826,057, entitled "ELECTRONIC CABINET PANEL WITH IMPROVED LATCHING MECHANISM", the entire teachings of which are hereby incorporated by reference.

During operation of the rack mount data storage system, air passes through ducts of the front panels to provide cooling to the disk drives and the related circuitry. Additionally, light from rows of disk drive LEDs passes through the front panels for direct visual viewing by a user. In particular, an average height user standing approximately two feet away from the front of the system is capable of directly viewing disk drive LEDs through front panels at the top of the system with little or no head movement. The user is further capable of directly viewing disk drive LEDs through front panels at the bottom of the system by either (i) crouching (e.g., bending over or squatting) while standing approximately two feet away from the front of the system, or (ii) stepping further back from the system (e.g., to a location that is six feet away or more) to prevent the upper tiers of these front panels from obscuring respective rows of disk drive LEDs.

SUMMARY

In contrast to the above-described conventional front panel, there is an improved front panel assembly having a reflective member which is configured to reflect light from multiple LEDs of electronic circuitry (e.g., a row of disk drive LEDs). Such a reflective member is capable of reflecting light from the LEDs thus allowing a user to view the light from the LEDs indirectly for enhanced LED visibility. Accordingly, the user does not need to crouch or bend over awkwardly if the user is unable to view the LEDs directly. Instead, the user can simply view the light reflected from the reflective member and competently interpret status of the electronic circuitry. Moreover, such a front panel assembly is capable of being used with other similar front panel assemblies arranged in a column in front of an electronic rack to enable a user to concurrently view light (reflected and direct) from multiple front panel assemblies while simply standing in close range (e.g., two feet away) in front of the electronic rack.

The front panel assembly is capable of being used with an electronic equipment rack configured to support electronic circuitry having multiple LEDs (e.g., a rack mount data storage system having a row of disk drives). The front panel assembly includes a cover portion configured to separate an external space in front of the electronic equipment rack and an internal space within the electronic equipment rack. The front panel assembly further includes an attachment portion configured to attach to the electronic equipment rack, and a reflective member configured to reflect light from the multiple LEDs simultaneously in a direction toward the external space. Such a front panel assembly provides access to light from the LEDs both directly and indirectly (e.g., reflected light for viewing at indirect angles) for enhanced LED visibility.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improved front panel assembly has a reflective member which is configured to reflect light from multiple LEDs of electronic circuitry (e.g., a row of disk drive LEDs). Such a reflective member is capable of reflecting light from the LEDs thus allowing a user to view the light from the LEDs indirectly. As a result, the user does not need to crouch or bend over awkwardly if the user is unable to view the LEDs directly. Rather, the user can simply view the light reflected from the reflective member and competently interpret status of the electronic circuitry. Furthermore, such a front panel assembly is capable of being used with other similar front panel assemblies arranged in a column in front of an electronic rack to enable a user to concurrently view light (reflected and direct) from multiple front panel assemblies while simply standing in one place in front of the electronic rack for enhanced LED visibility.

Figure 1:
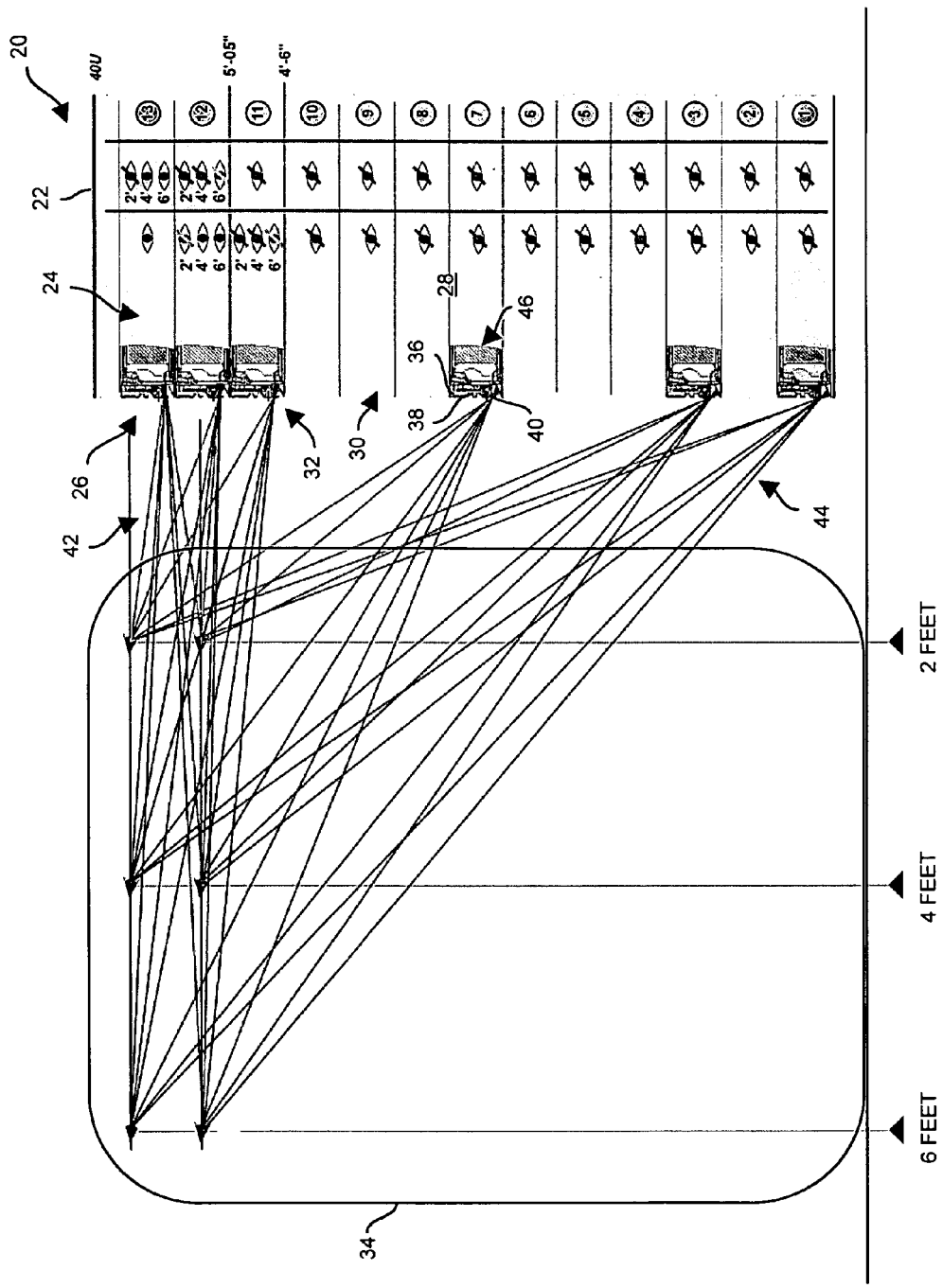
FIG. 1 is a cross-sectional side view of an electronic system having front panel assemblies with reflective members.

FIG. 1 shows an electronic system 20 having a frame 22, electronic circuitry 24 and a set of front panel assemblies 26. The frame 22 (e.g., a 40U-tall electronic equipment rack, an electronic cabinet, etc.) defines an internal space 28 and a front opening 30 to the internal space 28. The electronic circuitry 24 (e.g., circuitry for a data storage system, circuitry for a general purpose computer system, combinations thereof, etc.) resides within the internal space 28 and includes horizontal rows of LEDs 32 which face an external space 34 through the front opening 30. The front panel assemblies 26 mount to the frame 22 and substantially conceal the front opening 30. Nevertheless, the front panel assemblies 26 still allow light from the horizontal rows of LEDs 32 and air to pass therethrough thus providing limited access from the external space 34 to the electronic circuitry 28.

Each front panel assembly 26 includes a cover portion 36, an attachment portion 38 and a reflective member 40. The cover portion 36 is configured to provide separation between the external space 34 and the internal space 28. The attachment portion 38 (e.g., a locking and releasing mechanism) is configured to attach the front panel assembly 26 to the frame 22 and detach the front panel assembly 26 from the frame 22. The reflective member 40 is configured to reflect light from a horizontal row of LEDs 32 simultaneously in a direction toward the external space 34. As shown by direct view sight lines 42 and reflected sight lines 44 in FIG. 1, an average height user (e.g., an adult between 66 and 74 inches tall) standing at different distances from the front of the system 20 (e.g., two feet away, four feet away, six feet away, etc.) is capable of viewing light from all of the horizontal rows of LEDs 32 either directly or indirectly (reflected off of a reflective member 40) at the same time for enhanced LED visibility. That is, the user does not need to awkwardly crouch or move back to view all of the horizontal rows of LEDs 32 simultaneously. This feature will be explained in further detail shortly.

By way of example only, the electronic circuitry 34 forms at least a portion of a data storage system which is configured to perform data storage operations on behalf of one or more external host computers. Along these lines, the electronic circuitry 34 includes rows of disk drives 46 having status indicators (e.g., one or more status indicators for each disk drive 46) which form the horizontal rows of LEDs 32 facing the external space 34. Further details of the invention will now be provided with reference to FIG. 2.

Figure 2:
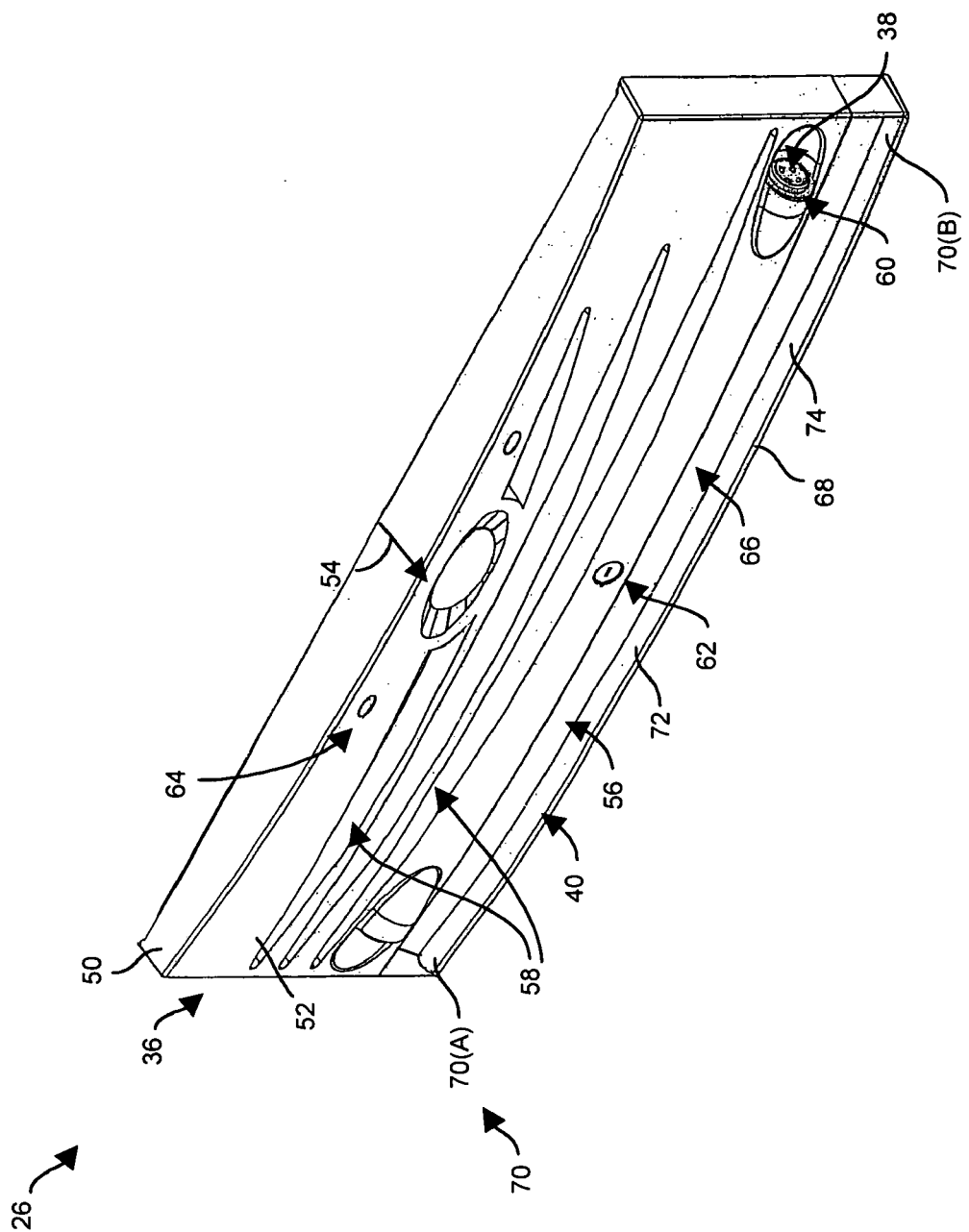
FIG. 2 is a perspective view of a front panel assembly of the electronic system of FIG. 1.

FIG. 2 is a perspective view of a front panel assembly 26 of the electronic system 20. The cover portion 36 includes side sections 50 (top, bottom, lateral, etc.) which reside adjacent the frame 22 when the attachment portion 38 attaches to the frame 22, and a central section 52 which bows from the side sections 50 in a direction 54 toward the external space 34 (also see FIG. 1). Additionally, the cover portion 36 defines an air vent 56 which extends horizontally across the cover portion 36 to allow air to pass between the external space 34 and the internal space 28. The cover portion 36 further defines multiple air ducts 58, button holes 60, a keyhole 62, and LED holes 64. The air vent 56 and the air ducts 58 allow air exchange between the external space 34 (e.g., ambient air) and the internal space 28 (e.g., air which has been heated by the electronic circuitry 24) to provide robust cooling of the electronic circuitry 24. The button holes 60 enable a user to actuate a release mechanism of the attachment portion 38. The keyhole 62 enables the user to operate a lock mechanism of the attachment portion 38 using a key and, thus, transition the attachment portion 38 between a locked state and an unlocked state. The LED holes 64 enable the user to view status lights of particular circuits of the electronic circuitry 34.

As illustrated by the arrow 66 in FIG. 2, but shown in further detail in subsequently figures, the cover portion 36 further defines a horizontal row of beveled holes 66 which align with a horizontal row of LEDs 32 of the electronic circuitry 24 (e.g., a row of disk drives 46, also see FIG. 1). Accordingly, light from the LEDs 32 easily passes toward the external space 34 for either direct viewing by a user or indirect viewing off of the reflective member 40 by the user.

As further shown in FIG. 2, the reflective member 40 is disposed horizontally along a bottom edge 68 of the air vent 56 defined by the cover portion 36. The reflective member 40 includes end portions 70(A), 70(B) (collectively, ends 70) which reside adjacent to the frame 22 (e.g., an electronic equipment rack) when the attachment portion 38 attaches to the frame 22 and a middle portion 72 which bows from the end portions 70 in the direction 54 toward the external space 34 in the same manner as the cover section 52.

The reflective member 40 (e.g., injection molded plastic with a chrome finish) is elongated in shape and is configured to reflect light from multiple LEDs 32 simultaneously in a direction toward the external space 34. In particular, the reflective member 40 defines a convex face 74 in order to reflect light from a horizontal row of LEDs 32 in an upward direction to a user standing in front of the system 20 (also see FIG. 1). A cross-section of the reflective member 40 is preferably less than 0.5 inches high and less than 0.5 inches deep regardless of the lateral location along the reflective member 40 (i.e., along the bottom edge 68 of the cover portion 36) thus providing the reflective member 40 with a small profile and the appearance of polished trim. Such a reflective member 40 is relatively inconspicuous and easy to utilize on existing conventional front panels for product upgrading and migration. Furthermore, such a reflective member 40 is very well suited for reflecting light from the LEDs 32 even if the LEDs 32 are somewhat recessed (e.g., by 1.0 to 1.5 inches from the frame opening 30, also see FIG. 1) and even if the LEDs 32 are relatively weak in intensity.

In some arrangements, the cross-section of the reflective member 40 varies to maximize the size of the external space 34 to provide optimal angles of incidence. In these arrangements, the reflective member 40 preferably aims the light from the LEDs 32 to enable the user to view all of the horizontal rows of LEDs 32 either directly or indirectly within a wide area in front of the system 20. That is, the curvature of the convex mirroring face 74 is optimized to provide robust reflection of the LEDs 32 to an average height person standing upright at two foot, four foot and six foot distances from the system 20 (e.g., see the external space 34 in FIG. 1).

In some arrangements, the light reflecting attributes of the materials of the cover portion 36 and the reflective member 40 are in sharp contrast (e.g., a dull finish for the cover portion 36 and a shiny chrome finish or other mirroring-type finish for the reflective member 40). These arrangements enable the light reflecting from the LEDs 32 to easily stand out when viewing the front panel assembly 26. Further details of the invention will now be provided with reference to FIG. 3.

Figure 3:
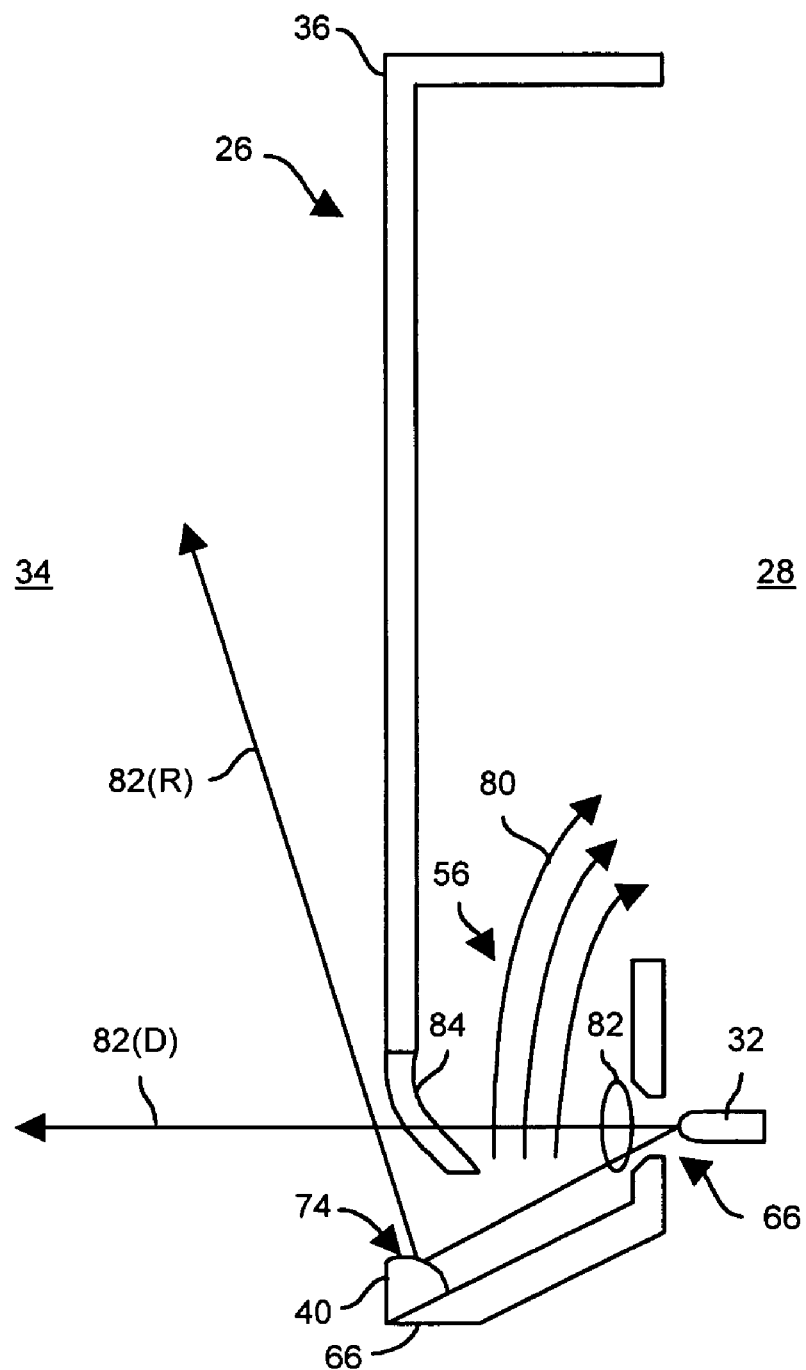
FIG. 3 is a block diagram illustrating a light reflecting operation of a reflective member of the front panel assembly of FIG. 2.

FIG. 3 is a block diagram illustrating particular portions of the front panel assembly 26. When the front panel assembly 26 is properly mounted to the frame 22 (FIG. 1), the air vent 56 defined by the cover portion 36 resides adjacent a portion of the electronic circuitry 24 (e.g., a row of disk drives 46, FIG. 1) and the horizontal row of beveled holes 66 defined by the cover portion 36 aligns with a horizontal row of LEDs 32 (e.g., LEDS 32 of the horizontal row of disk drives 46). Accordingly, air 80 passes through the air vent 56 to provide robust cooling of the electronic circuitry 24 within the internal space 28, and light 82 passes through the horizontal row of beveled holes 66 to allow a user in the external space 34 to obtain status information regarding the electronic circuitry 24 (also see FIG. 1).

As shown in FIG. 3, some light 82(D) travels in a straight ahead manner. Optionally, the cover portion 36 includes a curved transparent shield 84 (e.g., for aesthetics if simply clear, to control the intensity of the light 82(D), to modify the color of the light 82(D), etc.) causing the light 82(D) to be refracted but where the light 82(D) is still not reflected off of the reflective member 40. Additionally, some of the light 82(R) reaches the reflective member 40 and reflects off of the reflective member 40 in an upward direction. That is, as shown by the cross-section of the reflective member 40, light 80 reflects in a controlled manner off the convex face 74 defined by the reflective member 40. The curvature of the convex face 74 varies depending on the location along the long axis of the reflective member 40 in order to provide substantially uniform light reflection to the external space 34. Accordingly, the front panel assembly 26 is configured to provide visual access to the LEDs 32 of the electronic circuitry 24 regardless of whether the front panel assembly 26 mounts to a lower portion of the frame 22 near the bottom of the frame 22 (e.g., below four feet from the floor), or a higher portion of the frame nearer the top of the frame 22 (e.g., above four feet).

For example, suppose that an average height user (e.g., someone who is between 66 and 74 inches tall) is standing roughly two feet away or at arms length in front of the system 20. The user is capable of directly viewing the light 82(D) from the horizontal rows of LEDs 32 near the top of the system 20, and indirectly viewing the light 82(R) from the reflective members 40 of the front panel assemblies 26 originating from the horizontal rows of LEDs 32 near the bottom of the system 20. With reference directed back to FIG. 1 temporarily, the user is capable of performing such viewing without crouching (e.g., the user does not need to stoop or awkwardly lower the user's head). Furthermore, the user is capable of performing such viewing without needing to step backward away from the system 20. Further details will now be provided with reference to FIGS. 4 and 5.

Figure 4:
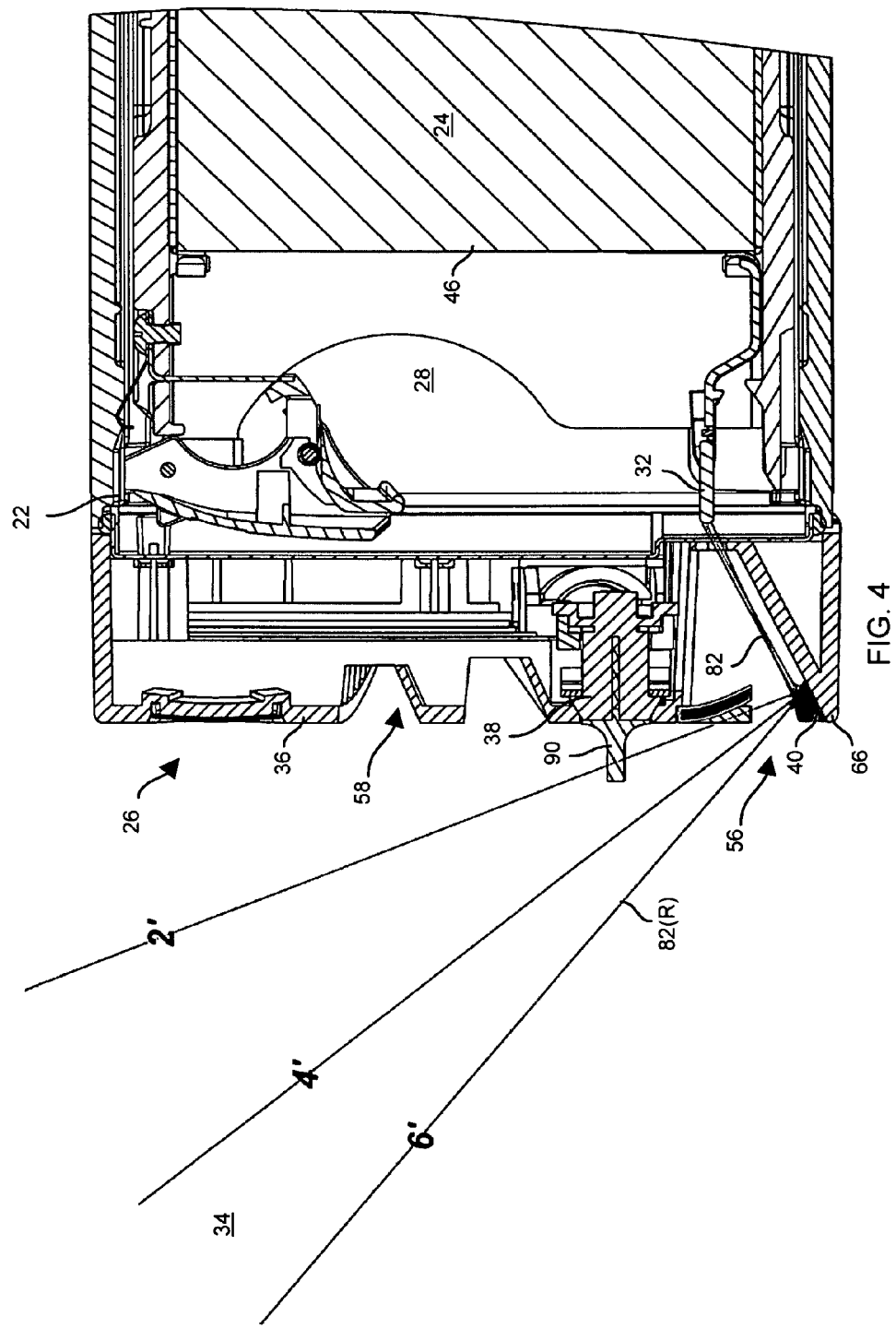
FIG. 4 is a cross-sectional side view of a front panel assembly located near a bottom of the electronic system of FIG. 1 when reflecting light from an LED to a user standing approximately two feet in front of the electronic system.
Figure 5:
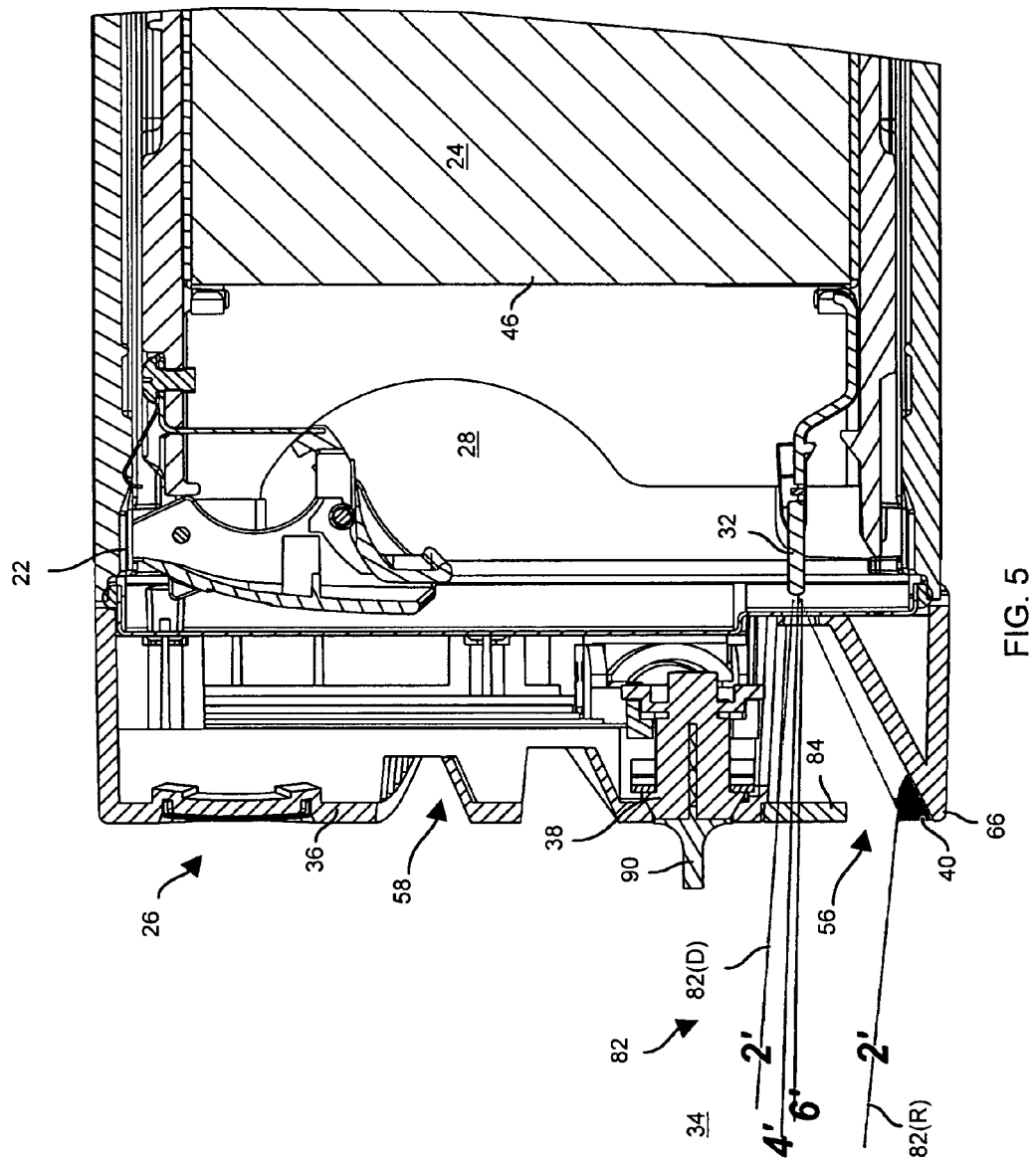
FIG. 5 is a cross-sectional side view of a front panel assembly located near a top of the electronic system of FIG. 1 when permitting light to be viewed directly from another LED by the user standing approximately two feet in front of the electronic system.

FIGS. 4 and 5 are cross-sectional side views of a front panel assembly 26. FIG. 4 shows the operation of the front panel assembly 26 when located near a bottom of the electronic system 20 (also see FIG. 1) when reflecting light 80(R) from an LED 32 (e.g., an LED 32 of a disk drive 46) to a user standing approximately two, four or six feet in front of the electronic system 20. FIG. 5 is a cross-sectional side view of the front panel assembly 26 when located near a top of the electronic system 20 when permitting light to be viewed directly from an LED 32 by the user standing approximately two, four or six feet in front of the electronic system 20.

As shown in FIG. 4, the reflected light 82(R) is easily viewable by the user standing in front of the system 20. In particular, the reflected light 82(R) from front panel assemblies 26 near the bottom of the system 20 is viewable by an average height user standing within a range of two feet away to six feet away in front of the system 20 without forcing the user to crouch. Accordingly, the user is capable of obtaining status information from the electronic circuitry 24 near the bottom of the system 20 while working adjacent the system 20. In particular, the user may wish to view the LEDs while servicing the system 20, e.g., while performing maintenance operations, while performing upgrades or tests, while unlocking one or more of the front panel assemblies 26 using a key 90, etc.

As shown in FIG. 5, the direct light 82(D) is easily viewable by the user standing in front of the system 20. In particular, the direct light 82(D) from front panel assemblies 26 near the top of the system 20 is viewable by the average height user standing within a range of two feet away to six feet away in front of the system 20 concurrently while the user also views the reflected light 82(R) from the front panel assemblies near the bottom of the system 20. In FIG. 5, the light 82(D) is shown passing through a clear straight shield 84 by way of example only. Accordingly, the user is capable of obtaining status information from all of the electronic circuitry 24 of the system 20 (i.e. seeing non-reflected light 82(D) from some LEDs 32 and reflected light 82(R) from other LEDs 32) while working adjacent the system 20 (e.g., while servicing the system 20).

As described above, an improved front panel assembly 26 has a reflective member 40 which is configured to reflect light 80 from multiple LEDs 32 of electronic circuitry 24 (e.g., a horizontal row of disk drive LEDs). Such a reflective member 40 is capable of reflecting light 80 from the LEDs 32 thus allowing a user to view the light from the LEDs 32 indirectly. As a result, the user does not need to crouch or bend over awkwardly if the user is unable to view the LEDs 32 directly. Rather, the user can simply view the light 80 reflected from the reflective member 40 and competently interpret status of the electronic circuitry 24. Furthermore, such a front panel assembly 26 is capable of being used with other similar front panel assemblies 26 arranged in a column in front of an electronic rack to enable a user to concurrently view light (reflected and direct) from multiple front panel assemblies 26 while simply standing in one place in front of the electronic rack.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the reflective member 40 was described above as being configured to reflect light from a horizontal row of disk drive LEDs 32 by way of example only. The reflective member 40 is capable being shaped and sized to reside in other locations and to reflect other types of light. For instance, in some arrangements, the reflective member 40 is configured to reflect light from a single source (e.g., a power supply, a circuit board, etc.). In other arrangements, the reflective member 40 is configured to reflect light patterns which are different than a horizontal row of LEDs (e.g., an irregular LED pattern, a column or two-dimensional array of LEDs, etc.).

Additionally, it should be understood that the reflective member 40 was described above as being elongated in shaped by way of example only. In other arrangements, the reflective member 40 has a different shape (e.g., a round or square shape, an oval or rectangular shape, an irregular shape, etc.).

Furthermore, the reflective member 40 does not need to reside in a front panel. In other arrangements, the reflective member resides in a different setting (e.g., a system panel, a circuit board, a facing of an input/output device, etc.).

What is claimed is:
1. An electronic system, comprising:
a frame defining an internal space;
electronic circuitry supported by the frame within the internal space, the electronic circuitry having multiple LEDs; and
a front panel assembly which includes (i) a cover portion configured to separate an external space in front of the frame and the internal space defined by the frame, (ii) an attachment portion coupled to the cover portion, the attachment portion being configured to attach to the frame, and (iii) a reflective member coupled to the cover portion, the reflective member being configured to reflect light from the multiple LEDs simultaneously in a direction toward the external space;

wherein the multiple LEDs of the electronic circuitry includes a row of LEDs, and wherein the reflective member of the front panel assembly includes an elongated section which reflects light from each LED of the row of LEDs concurrently in the direction toward the external space; and wherein the cover portion of the front panel assembly defines an air vent which extends horizontally across the cover portion to allow air to pass between the external space and the internal space, and wherein the reflective member of the front panel assembly is disposed horizontally along a bottom edge of the air vent defined by the cover portion.

2. The electronic system of claim 1 wherein the reflective member of the front panel assembly is substantially elongated in shape, and wherein the reflective member of the front panel assembly defines a convex face which reflects the light from the row of LEDs.

3. The electronic system of claim 2 wherein the cover portion of the front panel assembly provides a dull finish appearance, and wherein the reflective member of the front panel assembly provides a chrome finish appearance.

4. The electronic system of claim 2 wherein the reflective member of the front panel assembly is configured to reflect the light from the row of LEDs in an upward direction when the attachment portion attaches to the frame.

5. The electronic system of claim 1 wherein the reflective member is constructed and arranged to reflect the light from the row of LEDs to a viewing location which is at least two feet from the front panel assembly to enable a viewer at the viewing location to substantially distinguish the light from each LED of the row individually.

6. The electronic system of claim 5 wherein the row of LEDs is disposed at an LED height; and wherein the reflective member further is constructed and arranged to reflect the light from the row of LEDs to a viewing height at the viewing location which is at least four feet higher than the LED height.

7. An electronic system, comprising:
a frame defining an internal space;
electronic circuitry supported by the frame within the internal space, the electronic circuitry having multiple LEDs; and
a front panel assembly which includes (i) a cover portion configured to separate an external space in front of the frame and the internal space defined by the frame, (ii) an attachment portion coupled to the cover portion, the attachment portion being configured to attach to the frame, and (iii) a reflective member coupled to the cover portion, the reflective member being configured to reflect light from the multiple LEDs simultaneously in a direction toward the external space;
wherein the multiple LEDs of the electronic circuitry includes a row of LEDs, and wherein the reflective member of the front panel assembly includes an elongated section which reflects light from each LED of the row of LEDs concurrently in the direction toward the external space; and
wherein the electronic circuitry includes multiple horizontal rows of LEDs, and wherein the electronic system includes multiple front panel assemblies which includes the front panel assembly, each front panel assembly including:

a cover portion configured to separate the external space in front of the frame and the internal space;
an attachment portion coupled to that cover portion, the attachment portion being configured to attach to the frame; and
a reflective member coupled to that cover portion, the reflective member being configured to reflect light from a respective horizontal row of LEDs in a direction toward the external space.

8. The electronic system of claim 7 wherein the reflective member of each front panel assembly is constructed and arranged to reflect the light from a respective row of LEDs to a viewing location which is at least two feet from the front panel assembly to enable a viewer at the viewing location to substantially distinguish the light from each LED of the respective row individually.

9. A front panel assembly for an electronic equipment rack configured to support electronic circuitry having multiple LEDs, the front panel assembly comprising:
a cover portion configured to separate an external space in front of the electronic equipment rack and an internal space within the electronic equipment rack;
an attachment portion coupled to the cover portion, the attachment portion being configured to attach to the electronic equipment rack; and
a reflective member coupled to the cover portion, the reflective member being configured to reflect light from the multiple LEDs simultaneously in a direction toward the external space;
wherein the multiple LEDs of the electronic circuitry includes a row of LEDs, and wherein the reflective member includes an elongated section which reflects light from each LED of the row of LEDs concurrently in the direction toward the external space; and
wherein the cover portion defines an air vent which extends horizontally across the cover portion to allow air to pass between the external space and the internal space, and wherein the reflective member is disposed horizontally along a bottom edge of the air vent defined by the cover portion.

10. The front panel assembly of claim 9 wherein the reflective member is substantially elongated in shape, and wherein the reflective member defines a convex face which reflects the light from the row of LEDs.

11. The front panel assembly of claim 10 wherein the cover portion includes:
side sections which reside adjacent the electronic equipment rack when the attachment portion attaches to the electronic equipment rack;
a central section coupled to the side sections which bows from the side sections in a direction toward the external space, the reflective member including end portions which reside adjacent to the electronic equipment rack when the attachment portion attaches to the electronic equipment rack and a middle portion which bows from the end portions toward the external space.

12. The front panel assembly of claim 10 wherein the convex face defined by the reflective member is non-uniform along the length of the reflective member to provide cross-section dimensions which vary depending on a lateral location along the reflective member, the cross-section remaining less than 0.5 inches high and less than 0.5 inches deep regardless of the lateral location along the reflective member.

13. The front panel assembly of claim 10 wherein the cover portion provides a dull finish appearance, and wherein the reflective member provides a chrome finish appearance.

14. The front panel assembly of claim 10 wherein the reflective member is configured to reflect the light from the row of LEDs in an upward direction when the attachment portion attaches to the electronic equipment rack.

15. The front panel assembly of claim 10 wherein the cover portion defines a row of beveled openings to allow light from the row of LEDs to pass from the internal space to the reflective member.

16. The front panel assembly of claim 10, further comprising:
   a shield member coupled to the cover portion, the shield member having a curved cross-section and extending along a top edge of the air vent defined by the cover portion.

17. The front panel assembly of claim 9 wherein the reflective member is constructed and arranged to reflect the light from the row of LEDs to a viewing location which is at least two feet from the front panel assembly to enable a viewer at the viewing location to substantially distinguish the light from each LED of the row individually.

18. The front panel assembly of claim 17 wherein the row of LEDs is disposed at an LED height; and wherein the reflective member further is constructed and arranged to reflect the light from the row of LEDs to a viewing height at the viewing location which is at least four feet higher than the LED height.

* * * * *